(12) United States Patent
Kim et al.

(10) Patent No.: US 7,796,561 B2
(45) Date of Patent: Sep. 14, 2010

(54) METHOD OF SELECTING TRANSMISSION ANTENNA IN RADIO COMMUNICATION SYSTEM

(75) Inventors: Min-Jung Kim, Gyeonggi-Do (KR); Seung-Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 10/695,737

(22) Filed: Oct. 30, 2003

(65) Prior Publication Data

US 2004/0116079 A1    Jun. 17, 2004

(30) Foreign Application Priority Data

Oct. 31, 2002    (KR)    ...................... 10-2002-0067224

(51) Int. Cl.
*H04W 4/00*    (2009.01)
(52) U.S. Cl. ...................................... 370/334; 455/101
(58) Field of Classification Search .................. 370/334; 455/101
See application file for complete search history.

(56) References Cited

U.S. PATENT DOCUMENTS

| 5,689,439 | A | * | 11/1997 | Weerackody et al. | ......... | 370/329 |
| 5,799,245 | A | * | 8/1998 | Ohashi | ......... | 455/69 |
| 6,088,337 | A | * | 7/2000 | Eastmond et al. | ......... | 370/280 |
| 6,600,933 | B1 | * | 7/2003 | Hiramatsu et al. | ......... | 455/561 |
| 6,795,508 | B1 | * | 9/2004 | Odenwalder et al. | ......... | 375/267 |

FOREIGN PATENT DOCUMENTS

| CN | 1256031 | 6/2000 |
| JP | 60178726 A | 9/1985 |
| JP | 08256162 A | 3/1995 |
| JP | 08195704 A | 7/1996 |
| JP | 08293824 A | 11/1996 |
| JP | 14223248 A | 8/2002 |
| KR | 10-2002-0038206 | 5/2002 |
| KR | 1020020038206 A | 5/2002 |
| KR | 1020020038206 A | 5/2002 |

OTHER PUBLICATIONS

Texas Instruments, May 1999, TSG-RAN WG1 meeting #5, Open Loop Downlink Transmit Diversity for TDD, p. 1.*
Korean Office Action, dated Nov. 28, 2007.
Chinese Office Action, dated Jan. 25, 2008.

* cited by examiner

*Primary Examiner*—Lester Kincaid
*Assistant Examiner*—Steven Lim
(74) *Attorney, Agent, or Firm*—KED & Associates LLP

(57) ABSTRACT

Disclosed is a method of selecting a transmission antenna in a radio communication system. The present invention includes the steps of transmitting data through a sequentially selected antenna and if error occurs in the transmitted data, retransmitting corresponding erroneous data. Therefore, present invention presumes what channel state of antennas is better based on the response signal (ACK or NACK) of the reception party and then transmits data through the presumed antenna, thereby enabling to improve transmission performance more.

5 Claims, 7 Drawing Sheets

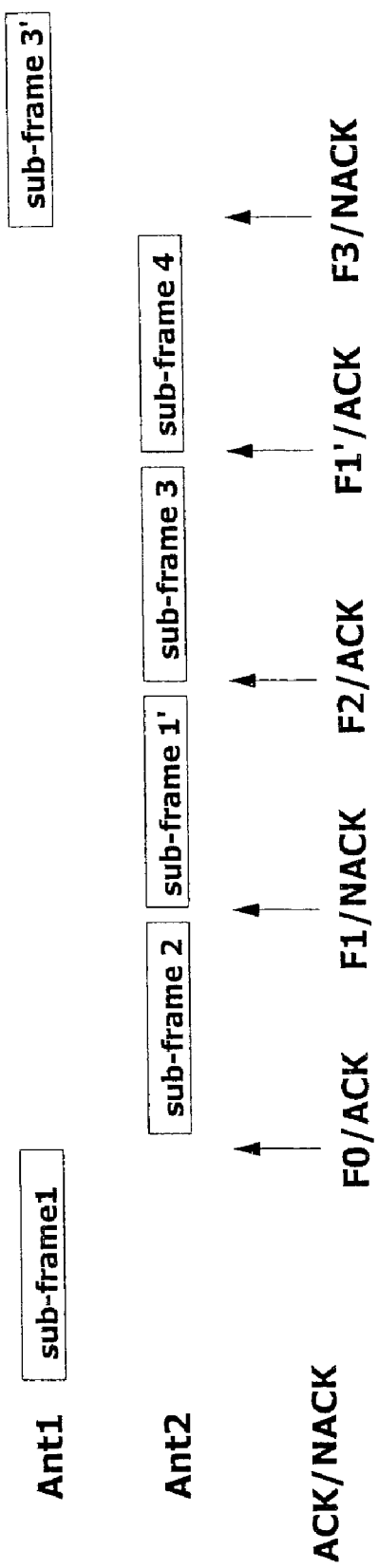

METHOD OF SELECTING TRANSMISSION ANTENNA IN RADIO COMMUNICATION SYSTEM

BACKGROUND OF THE INVENTION

1. Field of the Invention

The present invention relates to a packet retransmission method, and more particularly, to a method of re-transmitting packets in a radio communication system having a plurality of antennas.

2. Background of the Related Art

Lately, the third generation mobile communication system, to which many efforts and developments are made, supports multimedia services as well as voice services of the previous mobile communication system. Specifically, the multimedia services are essential to Internet spreading worldwide. In order to support high-speed multimedia services capacities of uplink and downlink should be greatly increased. The downlink capacity is determined by maximum transmission power used by a cell site, i.e. base station. Hence, if we can reduce required SNR for calling of all of the mobile terminals existing in a calling area of the base station, the downlink capacity can be increased. The uplink capacity can be increased by Space Diversity, Multi-user Detector, etc. Theses methods are applied to the uplink because a reception device of the base station has an allowable limitation of complexity larger than that of the mobile terminal and also a power consumption limitation smaller than that of the mobile terminal.

Such a method as space diversity, multi-user detector and the like has difficulty in being applied to the mobile terminal to increase the downlink capacity. The size and power consumption of the mobile terminal and the system complexity set limitations to the application of the downlink, i.e. reception algorithm of the mobile terminal. Many efforts are made to the method of increasing downlink communication capacity by increasing complexity of a transmitter instead that of a receiver. One of such efforts is Transmit Diversity.

Transmit Diversity provides multi-paths between the transmitter and receiver by multiple antennas in a transmitter side of the downlink, thereby enabling a diversity gain generated from using Reception Diversity. Such a method increases communication capacity over the downlink without increasing the complexity or size of the mobile terminal to improve communication performance.

Asynchronous WCDMA (wideband code division multiple access) standards of 3GPP ($3^{rd}$ generation partnership project) as one of $3^{rd}$ generation mobile communication standards include two kinds of Transmit Diversity technologies. One is an open loop transmit diversity type and the other is a closed loop transmit diversity type. STTD (space time transmit diversity) and TSTD (time switched transmit diversity) belong to the open loop transmit diversity type, and CL1 (closed loop mode 1) and CL2 (closed loop mode 2) belong to the closed loop transmit diversity type. The open loop mode is that the transmitter does not use information of channel state, which changes a transmission antenna periodically using multiple transmission antennas or uses simple encoding. The closed loop mode use feedback information of channel state to calculate the weight of an antenna for transit diversity. It is known that the closed loop mode, compared to the open loop mode, receiving information of the channel state from the receiver has more improved performance.

In STTD or TSTD, a transmission antenna is added to a conventional single transmission antenna system. In STTD, a transmitter equipped with two (or four) transmission antennas separately encodes and modulates data of the same signal source, transmits them through the respective antennas, and a receiver then combines to demodulate them to improve reception performance.

TSTD is a method of transmitting data by switching a pair of transmission antennas periodically, which is adopted for downlink transmit diversity of a system following UMTS (universal mobile telecommunication system) standards as a European IMT-2000 mobile communication system.

TSTD of the UMTS standards is applied to 1.28 Mcps TDD (time division duplex, which performs transmission and reception by time division). TSTD performs switching operation so that antenna transmitting data each 5 ms sub-frame as transmission unit of 1.28 Mcps TDD is switched.

A configuration of a TSTD system defined in UMTS standards of 3GPP is shown in FIG. 1.

Referring to FIG. 1, a front part of a TSTD system is a structure of a general transmission signal processing part existing in a conventional single antenna system, and a rear part is a TSTD device part.

A signal (or data) processed through the front part of the TSTD system is switched to be transmitted to respective antennas ANT1 and ANT2 over DSCH (downlink shared channel).

Packet data service adopts a technique of using correction codes and a technique of requesting retransmission for the reliable data transmission. Various techniques of requesting retransmission by detecting error at a reception part are explained as follows.

First of all, there is 'simple information feedback' which is performed in the following manner. Once information received by a receiver is sent back to a transmitter, the transmitter detects any error in the corresponding information and the corresponding information is then retransmitted if there exists errors.

Secondly, there is 'ARQ (automatic repeat request)', in which a receiver checks any error in transmitted data and request a retransmission of the corresponding erroneous data to the transmitter if there exists errors.

Thirdly, there is 'parity check', which includes 'error detection coding' of checking any error in the transmitted data. And the receiver executes error check by using redundant 1 check bit.

Fourthly, there is 'cyclic redundancy check (CRC)' of adding CRC code by block unit to transmit.

The ARQ technique is grouped into stop-and-wait ARQ, continuous ARQ, and adaptive ARQ types.

The stop-and-wait ARQ is performed in a manner that a transmitter transmits one data block and waits until response signal is arrived in the receiver. The receiver transmits 'negative acknowledgment (hereinafter abbreviated NACK)' if error is detected in the transmitted data block. If error is not detected in the transmitted data block, the receiver transmits 'acknowledgment (hereinafter abbreviated ACK)' to the transmitter. The transmitter transmits a next block if receiving the ACK signal from the receiver, or retransmits the corresponding data block if receiving the NACK signal no response until a predetermined time passes.

The continuous ARQ type is for compensating a disadvantage of the stop-and-wait ARQ type and is grouped into 'Go-Back-N ARQ' and 'Selective ARQ'. The Go-Back-N ARQ is carried out in a manner that, once NACK signal is transmitted from a receiver, a transmitter retransmits all blocks thereafter as well as a corresponding error block. The selective ARQ is a technique of retransmitting the block corresponding to the NACK signal only.

The adaptive ARQ is a method of adjusting a length of a block dynamically to increase transmission efficiency, in which a receiver transfers an error rate to a transmitter then the transmitter adjusts the length of the block appropriately to transmit. Therefore, the adaptive ARQ type has good transmission efficiency.

The above-explained ARQ methods are equivalently applied to a radio packet transmission system as well. Even though various ARQ types are applicable to the radio packet communication system, the receiver should transmit the ACK or NACK signal to the transmitter basically and each of the ACK and NACK is defined by 1 bit. Namely, if the receiver transmits ACK signal, e.g., 1, of 1 bit, the transmitter judges that the transmitted packet is correctly received. If the reception party transmits NACK signal, e.g., −1, the transmitter judges that the receiver fails to receive the packet correctly and then retransmits the corresponding data packet.

FIG. 2 shows the conventional antenna switching pattern of a TSTD system. Referring to FIG. 2, a length of a sub-frame of 1.28 Mcps is 5 ms. First and second antennas ANT1 and ANT2 alternately transmit sub-frames, respectively. Yet, slots of each sub-frames are transmitted though the same antenna.

As mentioned in the foregoing explanation, a receiver in a TSTD system performs an error check to transmit ACK or NACK response to a transmitter. If the response is ACK, the transmitter transmits a following frame. If the response is NACK, a corresponding error frame is retransmitted. In this case, a antenna switching (or selection) pattern (hereinafter called antenna switching) of the related art TSTD is sequential and repeatable. Namely, not considering channel state of each antenna regardless of the retransmitted frame or new frame, the transmission is performed through the antennas switched to each other by a predetermined time interval (sub-frame unit).

FIG. 3 is a diagram of an example of antenna assignment according to a related art.

Referring to FIG. 3, it is assumed that transmission delay time is one sub-frame (5 ms). Namely, after ith sub-frame sub-frame_i has been transmitted, a response signal ACK or NACK of a receiver for an (i−1)th sub-frame sub-frame_i−1 is received. If the response signal is NACK, (i−1)th sub-frame sub-frame_i−1 is retransmitted, If the response signal is ACK, (i+1)th sub-frame sub-frame_i+1 is retransmitted.

An antenna assignment method according to a related art performs according to TSTD technique of having a pair of antennas ANT1 and ANT2 transmit sub-frames sub-fram_0 to sub-frame_n alternately.

Namely, if sub-frame_1 is transmitted to the first antenna, sub-frame_2 is transmitted to the second antenna, sub-frame_3 is transmitted to the first antenna, sub-frame_4 is transmitted to the second antenna, etc. Such operation is repeated until all the sub-frames are transmitted.

The above-explained antenna assignment method is re-explained provided errors exist in transmitting sub-frame_1 and sub-frame_3.

Having transmitted sub-frame_1 to the first antenna, the transmitter transmits sub-frame_2 to the second antenna. After transmission of sub-frame_2, the transmitter receives a signal F1/NACK informing of error existence. Once the signal F1/NACK is received, the transmitter transmits retransmission frame sub-frame_1' of sub-frame_1 as a next frame of sub-frame_2 to the first antenna. Thereafter, the transmitter transmits sub-frame_3 to the second antenna and then transmits sub-frame_4 to the first antenna.

After transmission of sub-frame_4, the transmitter receives a signal F3/NACK informing that error exists in sub-frame_3. Once the signal F3/NACK is received, the transmitter transmits retransmission frame sub-frame_3' of sub-frame_3 to the second antenna as a next sub-frame of sub-frame_4.

In fading environments where the channel state slowly varies, the TSTD system having ARQ applied thereto enables to maintain independency between retransmission sub-frames using space diversity by switching transmission antennas.

However, the antenna switching of the related art TSTD system is performed sequentially and repeatedly regardless of the channel states of the two antennas ANT1 and ANT2, whereby it is unable to consecutively use the antenna having a better channel state.

SUMMARY OF THE INVENTION

Accordingly, the present invention is directed to a method of assigning transmission antennas in a radio communication system that substantially obviates one or more problems due to limitations and disadvantages of the related art.

An object of the present invention is to provide a method of assigning transmission antennas in a radio communication system, by which a specific antenna is selected to consider channel state of the respective transmission antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a packet transmission system having a plurality of antennas, a method of selecting a transmission antenna according to the present invention includes the steps of transmitting data through a sequentially selected antenna and, if error occurs in the transmitted data, retransmitting corresponding erroneous data.

Preferably, the retransmission step includes the steps of selecting the specific antenna and retransmitting the corresponding erroneous data through the selected specific antenna.

More preferably, after the retransmission step, the method further includes the steps of sequentially selecting the antennas again and transmitting rest of the data through the selected antenna.

More preferably, the specific antenna is one of the antennas except the antenna having performed previous transmission of erroneous data.

Preferably, the retransmission step includes the steps of selecting the specific antenna, retransmitting the corresponding erroneous data through the selected specific antenna, and transmitting rest of the data through the selected specific antenna.

More preferably, the rest of the data is kept being transmitted until other data transmission error occurs.

In another aspect of the present invention, in a packet transmission system having a multiple antennas, a method of selecting a transmission antenna includes the steps of checking a response signal of a receiver and if the response signal is a retransmission request signal, retransmitting corresponding erroneous data through a specific selected antenna.

Preferably, the checking step includes the steps of sequentially selecting the antennas, transmitting data through the selected antenna, and receiving to check the response signal of the receiver.

Preferably, the retransmission step includes the steps of selecting the specific antenna and retransmitting the corresponding erroneous data through the selected specific antenna.

More preferably, the packet transmission system performs the transmission according to TSTD (time switched transmit diversity)

Preferably, an error control method of ARQ (automatic repeat request) is appled to the packet transmission system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram of a method of assigning antennas according to a second embodiment of the present invention.

DETAILED DESCRIPTION OF THE INVENTION

Reference will now be made in detail to the preferred embodiments of the present invention, examples of which are illustrated in the accompanying drawings.

Figure 1:
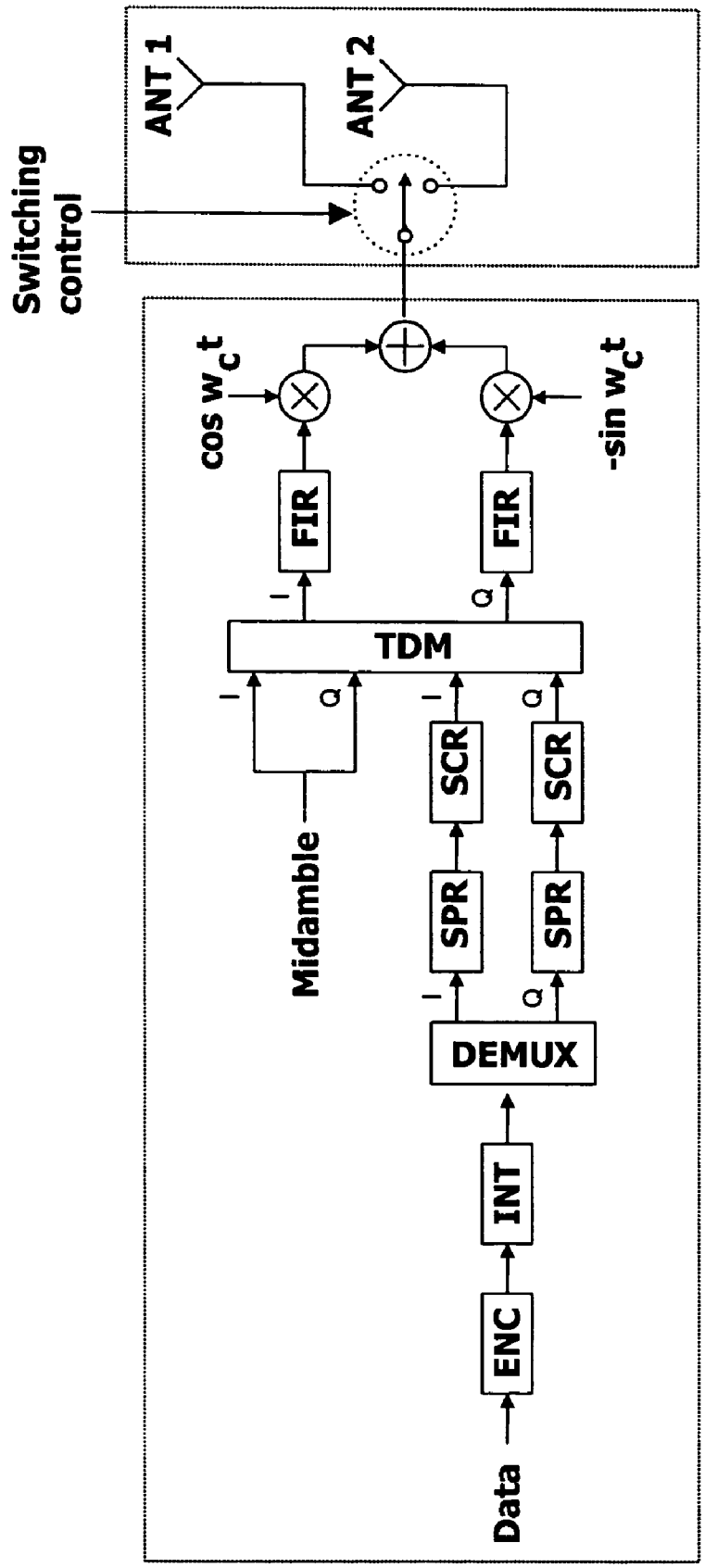
FIG. 1 illustrates a block diagram of a configuration of a TSTD system defined in UMTS standards of 3GPP.
Figure 2:
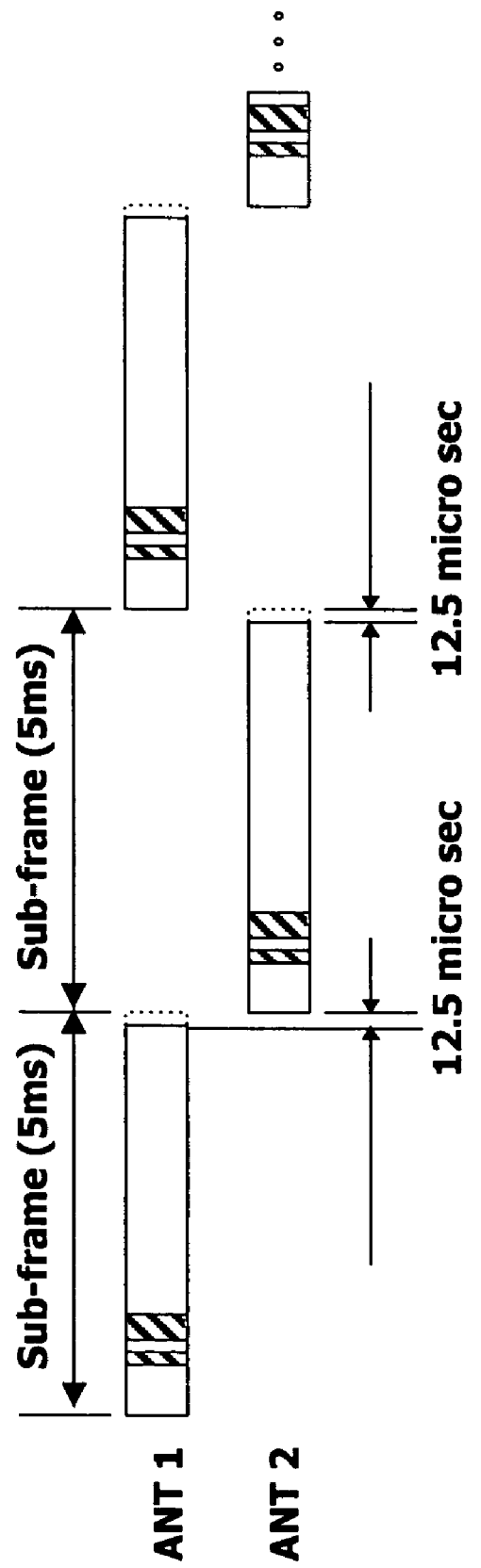
FIG. 2 is a diagram of an antenna switching pattern of a TSTD system according to a related art.
Figure 3:
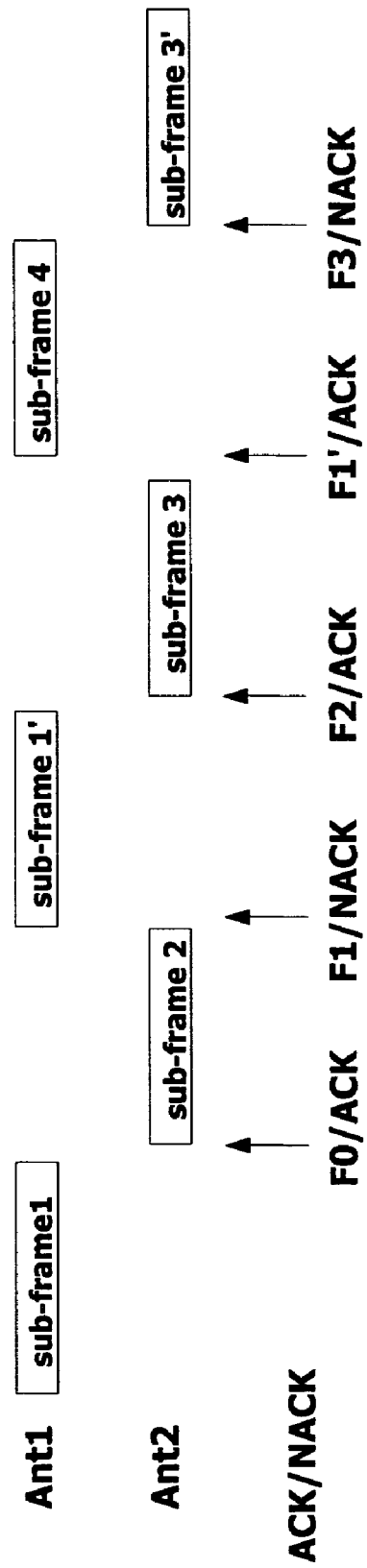
FIG. 3 is a diagram of an example of antenna assignment according to a related art.
Figure 4:
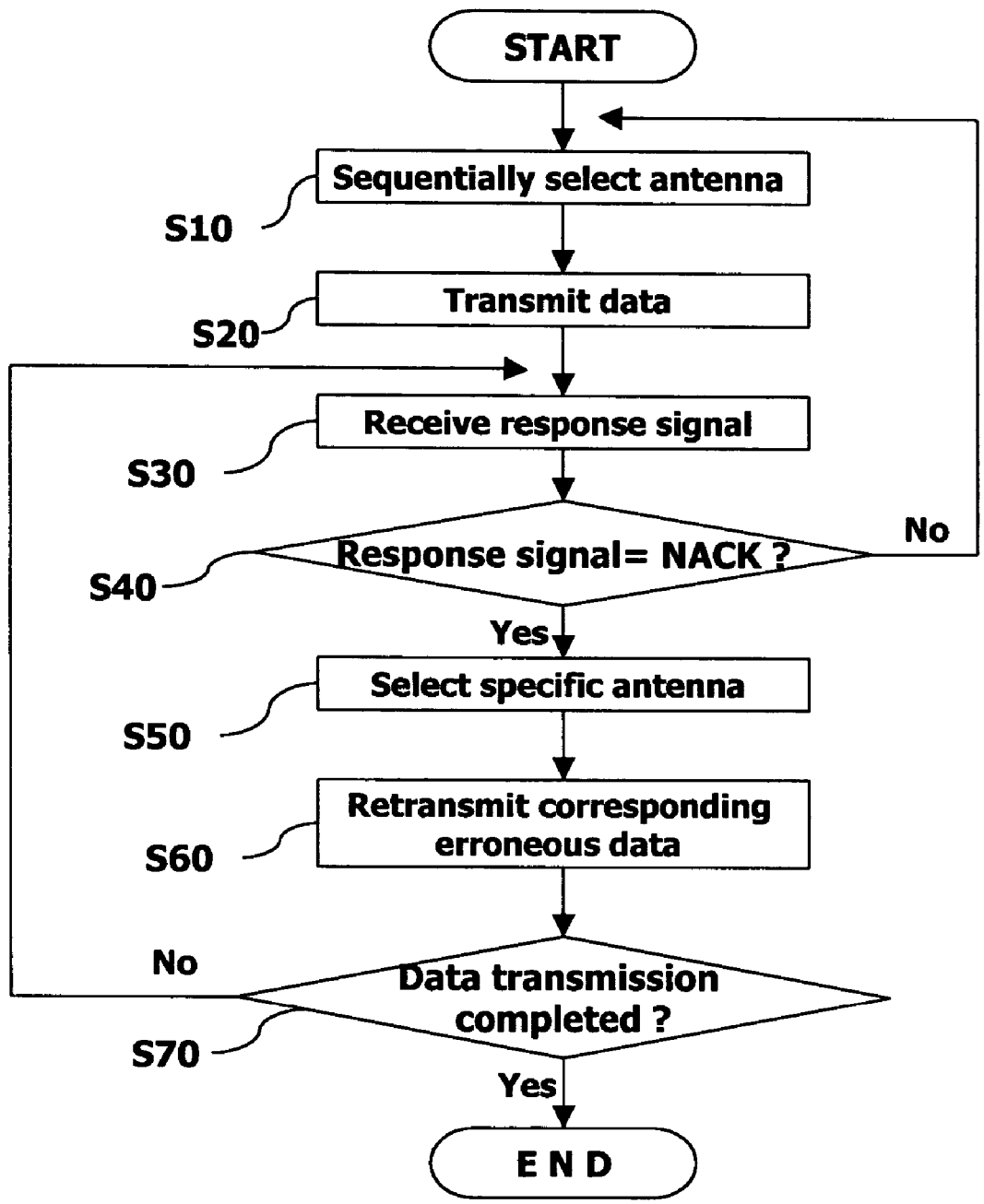
FIG. 4 is a flowchart of a method of assigning antennas according to a first embodiment of the present invention.
Figure 5:
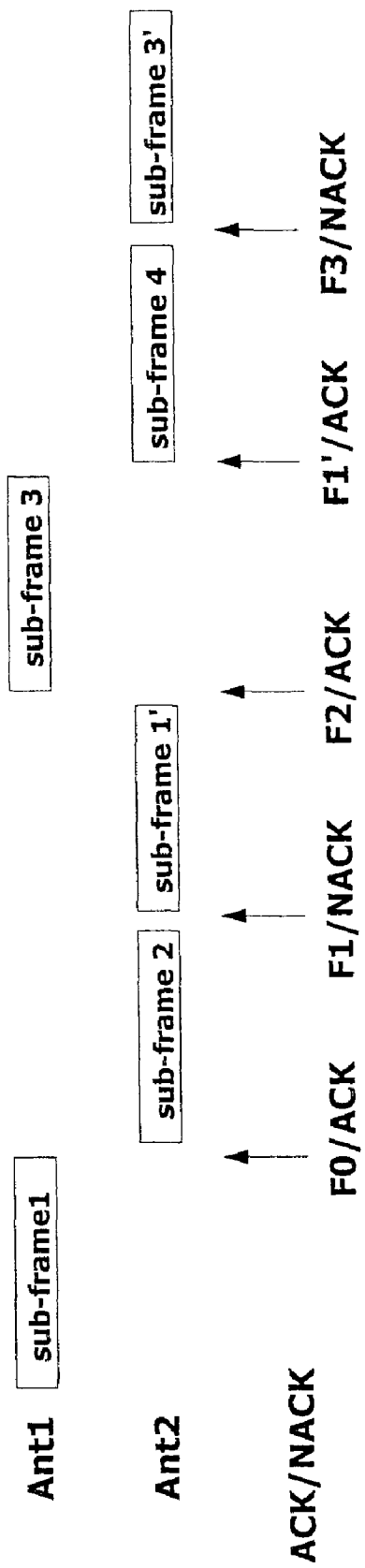
FIG. 5 is a diagram of a method of assigning antennas according to a first embodiment of the present invention.

FIG. 4 is a flowchart of a method of assigning antennas according to a first embodiment of the present invention and FIG. 5 is a diagram of depicting a method of assigning antennas according to a first embodiment of the present invention.

Referring to FIG. 4, a method of assigning antennas according to a first embodiment of the present invention includes the steps of selecting antennas sequentially (S10), transmitting data via the selected antenna (S20), receiving to check a response signal of a receiver (S30, S40), selecting a specific one of the antennas if the response signal is a retransmission request signal (S50), and retransmitting corresponding error data via the selected specific antenna (S60).

A method of assigning antennas according to a first embodiment of the present invention is explained by referring to FIG. 4 and FIG. 5 as follows.

First of all, it is assumed that transmissions of sub-frame_1 and sub-frame_2 are erroneous.

A concept of a method of assigning antennas according to a first embodiment of the present invention is based on the fact that 'sub-frame for retransmission is switched to be transferred through the antenna different from another antenna through which original sub-frame was transferred'.

Such a concept is explained in detail as follows.

First of all, each of the sub-frames is transmitted by the related art method before a signal F1/NACK is received. Meanwhile, if the signal F1/NACK is received from the receiver, the transmitter transmits retransmission frame (sub-frame_1') of sub-frame_1 as a next sub-frame of sub-frame_2 through a second antenna instead of a first antenna. This follows the concept that 'sub-frame for retransmission is switched to be transferred through the antenna different from another antenna through which original sub-frame was transferred'.

After transmission of sub-frame_1', each of the sub-frames is transmitted by the related art method before a signal F3/NACK is received. Since sub-frame_1' is transmitted through the second antenna, sub-frame_3 an sub-frame_4 are transmitted through the first and second antennas, respectively.

Meanwhile, if the signal F3/NACK is received from the receiver, the transmitter transmits sub-frame_3' as a next frame of sub-frame_4, by which sub-frame_3' is transmitted through the second antenna instead of the first antenna.

Figure 6:
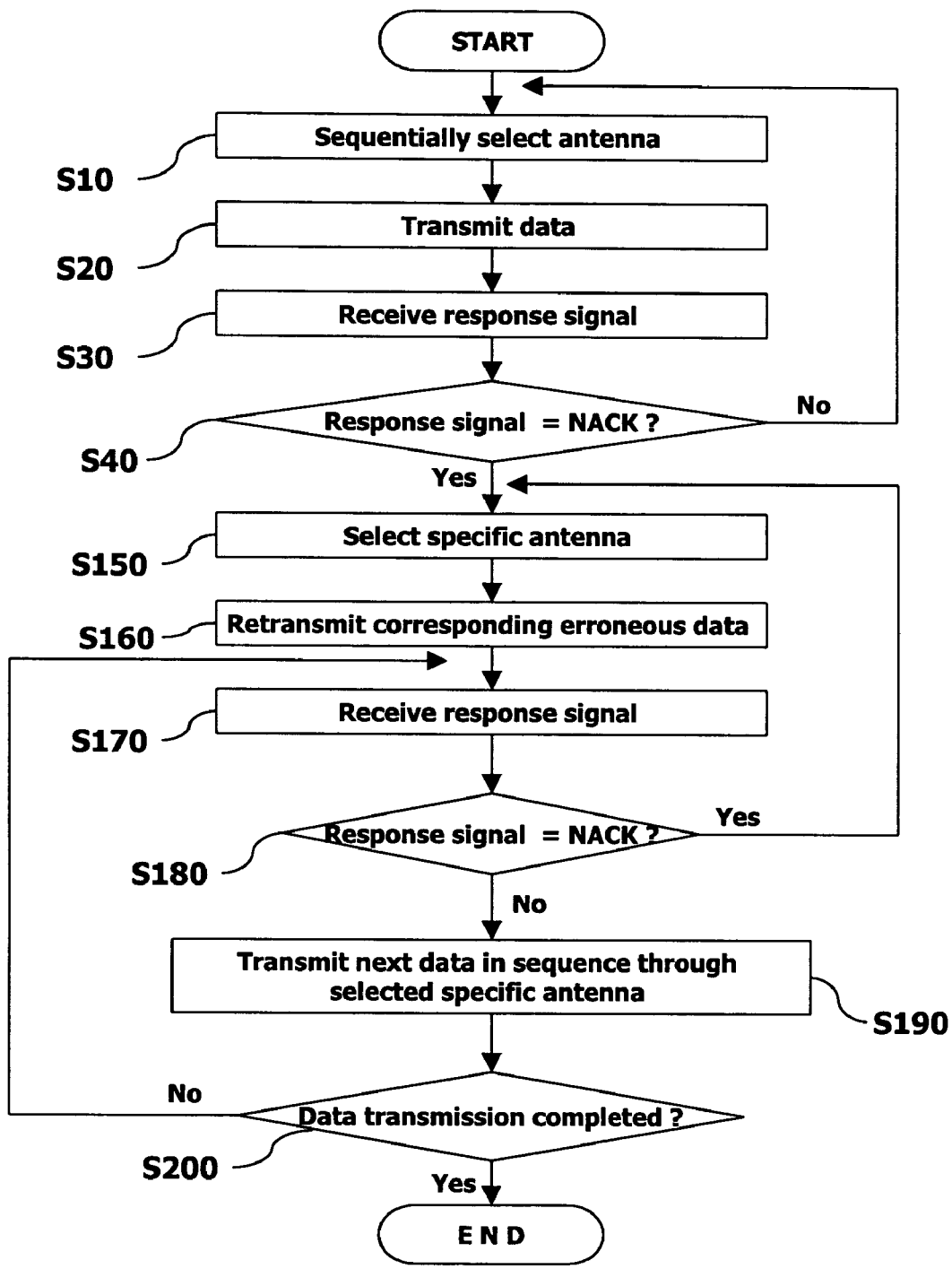
FIG. 6 is a flowchart of a method of assigning antennas according to a second embodiment of the present invention.

FIG. 6 is a flowchart of a method of assigning antennas according to a second embodiment of the present invention and FIG. 7 is a diagram of depicting a method of assigning antennas according to a second embodiment of the present invention.

Referring to FIG. 6, a method of assigning antennas according to a second embodiment of the present invention includes the steps of selecting antennas sequentially (S10), transmitting data through the selected antenna (S20), receiving to check a response signal of a reception party (S30, S40), selecting a specific one of the antennas if the response signal is a retransmission request signal (S150), retransmitting corresponding error data via the selected specific antenna (S160), and transmitting rest of the data through the selected specific antenna (S190).

A method of assigning antennas according to a second embodiment of the present invention is explained by referring to FIG. 6 and FIG. 7 as follows.

A concept of a method of assigning antennas according to second embodiment of the present invention is based on the fact that 'if original sub-frame was transmitted through a first antenna, sub-frame for retransmission and the following sub-frames are switched to be transferred through the antenna causing no transmission error'.

Such a concept is explained in detail as follows.

First of all, each of the sub-frames is transmitted by the related art method before a signal F1/NACK is received. Meanwhile, if the signal F1/NACK is received from the receiver, the transmitter transmits retransmission frame (sub-frame_1') of sub-frame_1 as a next sub-frame of sub-frame_2 through a second antenna instead of a first antenna.

After retransmission of sub-frame_1' each of the sub-frames sub-frame_3 and sub-frame_4 is transmitted through the second antenna before a signal F3/NACK is received. This is based on the fact that a channel of the second antenna is more stable than that of the first antenna bringing about error.

Meanwhile, if the signal F3/NACK is received from the receiver, the transmitter transmits sub-frame_3' as a next frame of sub-frame_4, by which sub-frame_3' is transmitted through the first antenna instead of the second antenna.

Thereafter, before other NACK signal is received, the rest of the sub-frames sub_frame_5, . . . , sub_frame_n are transmitted through the first antenna.

Accordingly, a method of assigning antennas according to the present invention presumes what channel state of antennas is better based on the response signal (ACK or NACK) of the receiver and then transmits data through the presumed antenna, thereby enabling to improve transmission performance more.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of selecting a transmission antenna in a packet transmission system having multiple antennas, comprising:

transmitting a first data block through a first one of a plurality of sequentially selected antennas;

transmitting a second data block through a second one of the plurality of antennas;

receiving a first signal indicating that an error occurred during transmission or reception of the first data block, the first error signal received after transmission of the second data block;

interrupting sequential selection of the plurality of antennas to select the second one of the plurality of antennas in response to the first error signal;

retransmitting the first data block only through the second one of the plurality of antennas, wherein the first data block is retransmitted in consecutive sequence with the second data block transmitted by the second one of the plurality of antennas, said interruption of sequential selection of the plurality of antennas preventing the first data block from being retransmitted through the first one of the plurality of antennas;

resuming sequential selection of the plurality of antennas, after the first data block is retransmitted through the second one of the plurality of antennas, said resuming including transmitting a third data block through the first one of the plurality of antennas and thereafter a fourth data block through the second one of the plurality of antennas after acknowledgment signals are respectively received for the third and fourth data blocks; and transmitting additional data blocks through the sequentially selected antennas, wherein transmission and retransmission of the data block occurs through a mobile communication system, and wherein an open loop transmit diversity technique is used to transmit data in the mobile communication system and the open loop transmit diversity technique is a TSTD (time switched transmit diversity) technique.

2. The method of claim 1, wherein the first error signal indicates whether a receiver correctly received the first data block transmitted through the first one of the plurality of antennas.

3. The method of claim 1, wherein the first error signal is a non-acknowledgment signal transmitted from a receiver.

4. The method of claim 1, wherein transmission and retransmission of the data block are downlink transmissions.

5. The method of claim 1, wherein the first error signal is received based on an ARQ (automatic repeat request) from a receiver.

* * * * *